June 18, 1946.  W. H. DU BOIS  2,402,317

REGULATING VALVE

Filed Dec. 17, 1943

INVENTOR
WILLIAM H. DuBOIS
BY
F. J. Plante
ATTY.

Patented June 18, 1946

2,402,317

UNITED STATES PATENT OFFICE 2,402,317

REGULATING VALVE

William H. Du Bois, South Bend, Ind., assignor to Bendix Aviation Corporation, South Bend, Ind., a corporation of Delaware Application December 17, 1943, Serial No. 514,609

11 Claims. (Cl. 303—54)

This invention relates to valves, commonly called regulating or pressure control valves, which are manually operated to regulate or control the admission of fluid under high pressure to a fluid pressure operable motor.

In my application Serial No. 429,147, filed February 2, 1942, now Patent No. 2,365,531, issued Dec. 19, 1944, I disclosed a regulating valve wherein effective sealing of the pressure fluid and high sensitivity of the valve in operation are obtained primarily by the use of poppet inlet and outlet valves and a diaphragm sealed pressure responsive reaction piston. The regulating valve disclosed in said application is quite satisfactory in hydraulic systems where the difference is not too great between the pressure prevailing at the pressure source and the maximum pressure required by the motor. However, where the pressure range between the pressure source and the motor is excessive, the regulating valves heretofore developed have tended to resist operation until the operator has exerted a high manual pressure, and then to rapidly build up pressure in the motor, thus causing a rather erratic and "jumpy" action. An example of a hydraulic system having an excessive differential between the pressure of the pressure source or accumulator, on the one hand, and the fluid pressure operable motor, on the other hand, is the hydraulic braking system of most modern airplanes. Many airplanes today are provided with hydraulic pressure accumulator systems wherein an extremely high pressure is maintained in order to operate various airplane parts and accessories, the pressures sometimes being as high as 3,000 pounds per square inch. At the same time, it is customary to operate the airplane brakes by utilizing the same hydraulic pressure source that is used to control the various other parts and accessories. Many airplane brakes have a maximum applying pressure of not over 400 or 500 pounds per square inch. This means that pressure from a 3,000 pound per square inch source must be used to apply brakes which only require 400 or 500 pounds per square inch for full application.

If the valve element in the regulating valve which controls the passage connecting the high pressure source to the brakes is pressure sealed, i. e. biased or held to its seat by the pressure prevailing at the pressure source, an extremely high pressure will have to be exerted by the operator in order to open the valve and begin application of the brakes. If the maximum brake applying pressure is low, full application of the brakes may be accomplished very quickly once the valve is opened. This means that the manual pressure required to open the valve will bear a relatively high ratio to the manual pressure required to fully apply the brakes, and consequently the graduation of the brake application will be unsatisfactory, and the brakes will tend to apply suddenly and violently.

If the pressure required to apply the brakes were high, the force required to open the valve would not be so large in proportion to the maximum brake pressure. Furthermore, high pressure brake applying systems usually require a relatively small volume of fluid and consequently the poppet valve which controls admission of fluid to the brakes can be made to a small diameter. However, when a poppet valve is made to control a hydraulic system which operates at low pressures, it usually requires a high displacement, and it is necessary that the valve be fairly large in diameter. The force tending to hold the valve closed will therefore be extremely high due both to the high pressure at the pressure source and to the large diameter of the valve.

An object of the present invention is to provide a regulating valve which will smoothly and effectively control communication between a relatively high pressure source, and a relatively low pressure motor.

A corollary object of the present invention is to provide a regulating valve which will be capable of accomplishing well graduated and highly sensitive control of a fluid pressure controlled motor, regardless of the pressure differential between said motor and the pressure source.

A more specific object of the present invention is to provide a regulating valve which will combine the advantages mentioned in the foregoing paragraphs with a valve construction in which the valve element controlling communication of fluid between the pressure source and the motor and the valve element controlling communication between the motor and exhaust are separate from one another in order to be capable of independent movement.

Other objects and advantages of the present invention will become apparent during the following description, reference being had therein to the accompanying drawing, in which.

Figure 1:
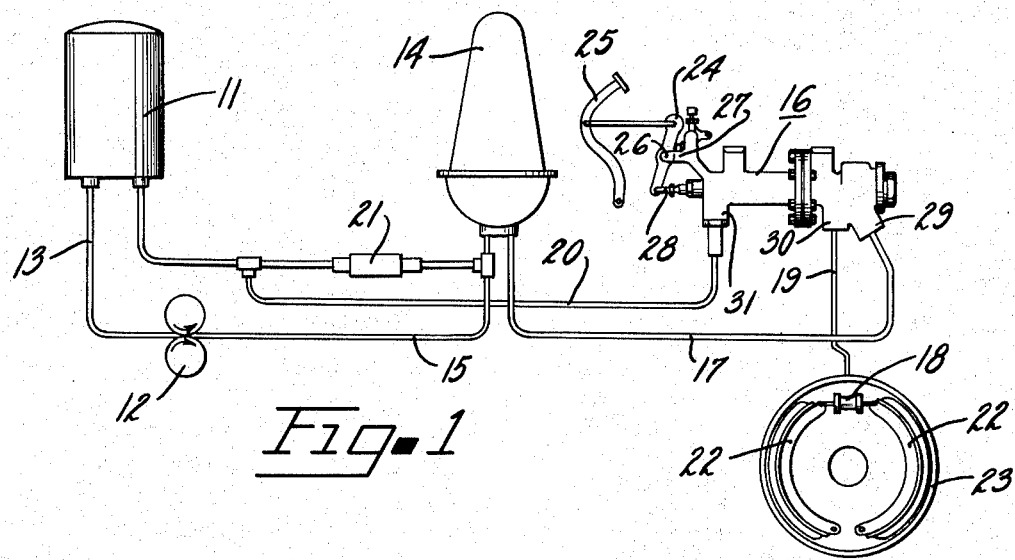
Figure 1 is a diagrammatic showing of a fluid pressure system incorporating my improved regulating valve.

A fluid pressure system utilizing my improved regulating valve may comprise, as shown in Fig. 1, a fluid reservoir 11, a pump 12, a conduit 13 connecting the reservoir to the pump, an accumulator 14 for storing fluid under pressure, a conduit 15 connecting the accumulator to the pump, a regulating valve 16, a conduit 17 connecting the regulating valve to the accumulator, a fluid pressure responsive motor 18, a conduit 19 connecting the motor 18 to the regulating valve, and a conduit 20 connecting the regulating valve to the reservoir. A pressure relief valve 21 may be connected between the accumulator and the reservoir to allow an escape of pressure fluid from the accumulator if the pressure builds up to a dangerously high point. The motor 18 is shown as being adapted to operate a brake by spreading a pair of brake shoes 22 against a brake drum 23. Obviously a fluid pressure responsive motor of any type might be utilized without departing from the scope of my invention and it might be utilized in accomplishing any function whatsoever, a brake being used in this instance for illustrative purposes only. Further, it should be pointed out that the regulating valve 16 will perform its desired function regardless of whether it is connected to an accumulator or is connected directly to a pump, it being immaterial whether the pressure fluid is stored prior to its use in operating the motor or whether the fluid is put under pressure simultaneously with its use in operating the motor.

As is well known in the art, in a fluid pressure system of the type shown in Fig. 1, the pump 12 draws fluid from the reservoir and forces it under pressure into the accumulator, and the fluid remains under pressure until the operator desires to use the pressure fluid in operating a motor. At that time, by actuating the regulating valve he may permit fluid under pressure to move from the accumulator to the motor and operate the motor. When operation of the motor is no longer desired, release of the regulating valve will allow fluid to return from the motor to the reservoir.

Figure 2:
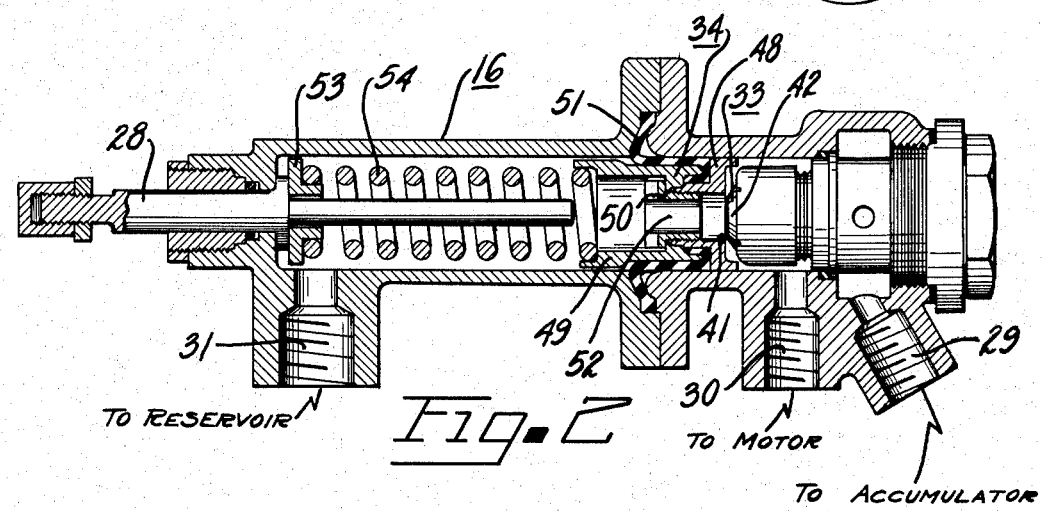
Figure 2 is a horizontal section taken through said improved regulating valve.
Figure 3:
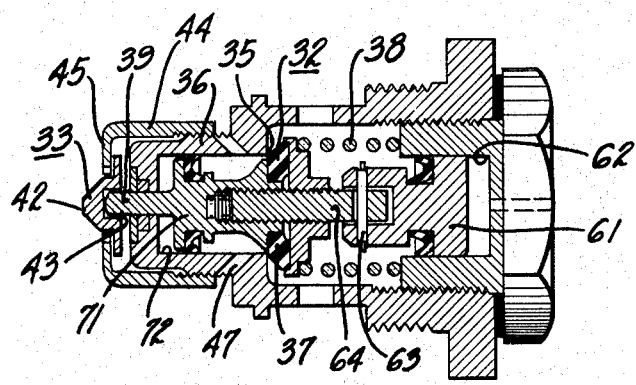
Figure 3 is a close-up of a portion of the regulating valve of Figure 2.

A lever 24 may be provided to operate the regulating valve 16, and this lever may either be operated by hand or may be connected to a foot pedal 25. The lever 24 is shown in Fig. 1 pivoted at 26 on an extension 27 protruding from the casing of the regulating valve 16. One end of the lever 24 is adapted to exert force against a push rod 28 (see Fig. 2), which extends into the interior of the regulating valve 16 to set into motion the actuation thereof. The regulating valve has an inlet port 29 connected to the accumulator by conduit 17, an outlet port 30 connected to the motor 18 by conduit 19, and an exhaust port 31 connected to the reservoir by conduit 20. Control of communication between the several ports is accomplished conjointly by a valve 32, (see Fig. 3,) a valve 33, and a piston 34. The valve 32 controls communication between accumulator port 29 and motor port 30, said valve 32 comprising a valve seat 35 formed in a hollow insert 36 screwed into the end of the regulating valve and a poppet valve element 37 which cooperates with the valve seat 35 to control communication between ports 29 and 30. A spring 38 may be provided to urge the valve element 37 toward closed position. The valve 33 comprises a valve seat 41 formed on the head of the piston 34 and a valve element 42 which cooperates with the valve seat 41 to control communication between ports 30 and 31, and which is formed with a guide opening 43 into which extends the end of valve stem 39.

Provision of separate inlet and exhaust valve elements 37 and 42, or, in other words, valve elements which are independently movable (at least to a slight extent), has certain distinct advantages. For one thing the possibility of misalignment of the valves with their seats is eliminated or considerably reduced and consequently leakage through the valves is held to a minimum. Furthermore, separation of the valve elements eliminates fluttering of the valve, allowing complete accuracy in finding lapped position, and therefore preventing a rapid on and off movement of the inlet valve due to an inability to find a truly balanced or lapped position. In a unit in which the inlet and exhaust valve are substantially one piece, at the instant the exhaust valve closes, the inlet valve opens, and the same is true in the reverse sense when the control valve is being released. This means that there is a tendency for the valve to overcompensate in balancing. In other words, no sooner does the inlet valve seat, than the exhaust valve opens slightly, reducing the pressure in the motor sufficiently to require the inlet valve to open again, thus setting up a vibration or flutter of the valve between open and closed position. This might not occur where a compressible fluid, such as air, is used, but it seems to be inherent in hydraulic systems which have integral or substantially integral inlet and exhaust valve elements. In the present case, by providing a slight clearance between the valves, enough relative movement of the valves is permitted to eliminate the tendency to flutter.

An annular nut 44 screwed onto the inner end of the hollow insert 36 has a flange 45 which is adapted to hold valve element 42 off its seat when the control valve is in released position. The hollow insert 36 is provided with a plurality of passages 47 to allow free communication between the interior of said hollow insert and the outlet or motor port 30 whenever valve 32 is open. The piston assembly 34 comprises a head portion 48, the outer circumferential surface of which slidingly engages the inner wall of the valve 16, a skirt portion 49, and a hollow nut 50 which serves to clamp the head 48 and the skirt 49 together. A flexible annular diaphragm 51 has its inner circular edge clamped between the head and skirt of the piston and its outer edge clamped to the wall of the regulating valve 16. A passage 52 extends through the whole piston assembly 34 so that communication of fluid from motor port 30 to reservoir port 31 is freely allowed through the center of said piston assembly except when the valve element 42 has seated at 41 on the piston head 48. Between a collar 53 movable with the manually operable rod 28 and the piston assembly 34 is a compression spring 54.

When the operator desires to actuate the brakes or other hydraulically controlled device, he causes the lever 24 to move in a counterclockwise direction about its pivot 26 forcing the rod 28 and collar 53 in a direction to compress the spring 54 and exert through the spring force on the piston assembly 34 moving it toward the valves 33 and 32. Movement of the piston first closes the valve 33 cutting off communication between motor port 30 and reservoir port 31, and subsequently movement of the piston, by pushing the valve element 42, pushes the valve stem 39 and moves poppet valve element 37 from its seat 35, allowing fluid under pressure from the accumulator to pass through port 30 to the hydraulic motor, and cause operation of said motor. Fluid under pressure from the accumulator, simultaneously with operating the motor 18, exerts a reaction force against the manually operated lever 24 through the medium of the piston head 48. The pressure of the fluid exerted against said piston head 48 tends to move the piston against the pressure of the spring 54, and when the fluid pressure against the piston head is sufficient, the spring will be compressed sufficiently to allow the piston to move toward its released position and allow poppet 37 to seat at 35, cutting off the accumulator or source of fluid pressure from the motor. In this position, with both valves 32 and 33 closed, the regulating valve is in lapped position. The operator by exerting further manual pressure on the lever 24 and simultaneously moving said lever 24 in a counterclockwise direction may once again open valve 32 and increase the pressure which is operating motor 18 by allowing a further flow of pressure fluid from the source of pressure to the motor. Because of the compressibility of spring 54, the regulating valve may be said to be position sensitive. This is true inasmuch as the operator, in order to increase his manually applied force, to thereby allow an increase in the pressure which is operating motor 18, must further compress the spring 54, and in order to do that, move the lever 24 further in a counterclockwise direction. When manual pressure on lever 24 is diminished or entirely eliminated, the force of pressure fluid from the pressure source will move the piston assembly 34 in a direction to first allow the valve 32 to close, cutting off the flow of pressure fluid, and to subsequently open the valve 33 allowing fluid from the motor to communicate with the reservoir and release the motor.

It is apparent that the inlet poppet 37 is held closed by the pressure in the accumulator or other pressure source. The greater the pressure maintained at said pressure source, the greater will be the force acting to hold the valve closed, a force which must be overcome by the operator before actuation of the motor 18 can begin. Furthermore, the larger the effective diameter of the poppet 37 (by "effective diameter" I mean the diameter of the sealed opening), the greater will be the force acting to hold the poppet closed.

In order to make it easier for the operator to open the poppet 37, and thereby permit smoothly graduated actuation of the valve, I provide pressure responsive means subjected to the pressure at the pressure source and acting in a direction tending to move the poppet 37 from its seat.

This pressure responsive means comprises a plunger 61 operating in a bore 62, and connected to the poppet valve element 37. Pressure on the plunger acts through a pin 63 and stem 64 to urge the poppet toward open position. I prefer that the area of plunger 61 be slightly less than the area of the valve seat. Thus a relatively small net pressure is exerted by the fluid cooperating with the spring 38 in holding the valve closed.

It would of course be possible to utilize a plunger 61 having an area as large as the area of the valve seat, thus fully balancing the force tending to hold the valve in closed position. However, a fully balanced valve has the disadvantage that it is particularly subject to "flutter." This means a constant and rapid opening and closing of the valve, which is noticeable to the operator, and creates an unsatisfactory pedal "feel." By providing a valve which is partially, but not fully balanced, I gain the advantages of a balanced valve, but avoid the disadvantage of "flutter." The fully balanced valve is subject to "flutter" because the light force required to open it is built up almost immediately upon closing of the valve due to reaction, and may be built up by the valve itself, as it closes.

Furthermore, if the valve is fully balanced, the only force holding the valve closed is the force of the spring 38. This is not a desirable situation for the reason that the force required to prevent leakage when the valve is closed depends upon the pressure at the pressure source. A high pressure at the pressure source will require a relatively heavy spring, whereas a low pressure at the pressure source would require only a relatively light spring. Although a spring sufficiently heavy to prevent leakage regardless of the pressure at the pressure source could be used, this would mean an unnecessarily high resistance to opening of the valve in a system having a pressure at the pressure source less than the maximum. With the arrangement of the present invention, the pressure which is effective in holding the inlet valve closed varies automatically with variations in the pressure at the pressure source, since the force holding the valve closed is determined by the pressure at said pressure source acting upon an area equal to the difference between the area of the valve seat and the area of the balancing piston. Thus the force holding the valve closed is always sufficient to prevent leakage, but is never excessive.

In order to prevent misalignment of the poppet with its seat due to its connection with the plunger, I prefer to provide a "universal" connection between the plunger and poppet, such that the poppet is permitted to find its own seat and thus seal effectively. This I accomplish by means of the pin connection, which permits relative pivotal movement of the parts, and by means of a slight clearance between the pin and the hole in the stem through which the pin extends.

Because of the relatively small net force holding the poppet 37 closed, the operator is able to open the valve with relatively light force. Thus the difference between manual force required to open the valve and that required to obtain full brake application is sufficiently great to permit smooth graduation and sensitive responsiveness of the valve. Furthermore, travel of the pedal is conserved, or, in other words, it is possible to open the valve initially with a relatively short pedal travel. This is true because the amount of force required to open the valve determines the amount of compression of the spring 54 necessary to build up the force, and consequently determines the length of pedal travel. If a light spring is used (with a valve requiring a large opening force) the pedal travel before the brakes begin to apply will be excessive. On the other hand, if a heavy spring is used in order to build up a high force with relatively short pedal travel, the graduation will be poor, since the pedal travel between initial opening of the valve and full application of the brakes will be extremely short.

The inlet valve arrangement thus far described operates satisfactorily provided the maximum applying pressure of the brakes is not too high. However, if the pressure required at the brakes is too high, the poppet valve element 37 will be held off its seat, once the high pressures are reached, regardless of the operator's actions, and the pressure at the brakes will build up to full accumulator pressure. The explanation of this is as follows: The only pressures resisting opening of the poppet 37 are due to the spring 38 (which is relatively light) and to the fluid under pressure acting on an area equal to the difference between the area of the poppet and the area of the plunger 61. As soon as the poppet is opened by manual exertion, the pressure in the motor and behind the poppet begins to increase. The increase of pressure behind the poppet gradually lowers the pressure differential over the poppet which has been biasing the poppet to closed position. On the other hand, the pressure acting against the plunger 61 remains as high as before. When the increase of pressure in the motor and behind the poppet has reached the point where the force due to the differential in pressures over the poppet plus the spring force is less than the force acting against plunger 61, then the poppet will be automatically forced to open position and held there until full accumulator pressure is built up at the brakes. This will not only cause violent application of the brakes, but may seriously injure the brake parts, which are intended to operate at much lower pressures.

In order to prevent such an occurrence, I provide means for neutralizing the effect of the pressure which builds up behind the poppet. Referring to the drawing, it will be seen that a plunger 71, reciprocable in a bore 72 provided in the hollow member 36, is connected to the poppet 37 in such a way that pressure acting on said plunger constantly urges the poppet to seat.

I prefer to make the diameter of the plunger 71 equal to the effective diameter of the poppet 37 in order that the pressure on the plunger will exactly counteract the pressure under the poppet tending to push it off its seat. Obviously variations in the relative diameters of the plunger and poppet are permissible, without preventing successful operation of the device.

In order to permit proper alignment of the poppet with its seat, I prefer to provide a fit between the plunger 71 and the walls of the bore 72 which is not too tight, and also to make the axial dimension of the plunger very small.

By using the plunger 71, I insure that pressure created in the motor and under the poppet will not tend to urge the poppet off its seat, and will have substantially no effect on the operation of the poppet.

Although a particular embodiment of my invention has been described, it will be understood by those skilled in the art that the object of the invention may be attained by the use of constructions different in certain respects from that disclosed without departing from the underlying principles of the invention. I therefore desire by the following claims to include within the scope of my invention all such variations and modifications by which substantially the results of my invention may be obtained through the use of substantially the same or equivalent means.

I claim:

1. In a regulating valve having an inlet port connected to a source of fluid under pressure, and an outlet port connected to a motor operable by fluid under pressure, an inlet valve controlling communication between the inlet port and the outlet port comprising a poppet valve element biased to its closed position by the pressure of fluid from the pressure source, a plunger connected to the poppet valve element and urged by the pressure of fluid from the pressure source in a direction tending to move the poppet valve element to open position, and a second plunger also connected to the poppet valve element and urged by the pressure prevailing in the fluid pressure operable motor in a direction tending to move the poppet valve element to closed position.

2. A regulating valve for a fluid pressure system comprising a valve body having an inlet port connected to a source of fluid under pressure, an outlet port connected to a motor operable by fluid under pressure, and an exhaust port connected to a fluid reservoir; an inlet valve for controlling communication between the inlet port and the outlet port, and including a valve seat, a valve element biased to the valve seat by the pressure of fluid from the pressure source, and a pressure responsive element subjected to the pressure prevailing in said fluid pressure operable motor and connected to the valve element, the pressure against said pressure responsive element being exerted in a direction tending to move the valve element toward its seat; and an exhaust valve for controlling communication between the exhaust port and the outlet port, and including a valve seat and a valve element biased to the seat by the pressure of fluid which serves to operate the fluid pressure operable motor.

3. A regulating valve for a fluid pressure system comprising a valve body having an inlet port connected to a source of fluid under pressure, an outlet port connected to a motor operable by fluid under pressure, and an exhaust port connected to a fluid reservoir; an inlet valve for controlling communication between the inlet port and the outlet port, and including a valve seat, a valve element biased to the valve seat by the pressure of fluid from the pressure source, a pressure responsive element subjected to the pressure prevailing in said fluid pressure operable motor and connected to the valve element, the pressure against said pressure responsive element being exerted in a direction tending to move the valve element toward its seat, and a second pressure responsive element subjected to the pressure of fluid from the pressure source and connected to the valve element, the pressure against second pressure responsive element being exerted in a direction tending to move the valve element from its seat; and an exhaust valve for controlling communication between the exhaust port and the outlet port, and including a valve seat and a valve element biased to the seat by the pressure of fluid which serves to operate the fluid pressure operable motor.

4. A regulating valve for a fluid pressure system comprising a valve body having an inlet port connected to a source of fluid under pressure, an outlet port connected to a motor operable by fluid under pressure, and an exhaust port connected to a fluid reservoir; an inlet valve for controlling communication between the inlet port and the outlet port, and including a valve seat, a valve element biased to the valve seat by the pressure of fluid from the pressure source, and a pressure responsive element subjected to the pressure prevailing in said fluid pressure operable motor and connected to the valve element, the pressure against said pressure responsive element being exerted in a direction tending to move the valve element toward its seat, the area of said pressure responsive element being substantially the same as the pressure responsive area of the seated valve element; and an exhaust valve for controlling communication between the exhaust port and the outlet port, and including a valve seat and a valve element independently movable with respect to the aforementioned valve element and biased to the seat by the pressure of fluid which serves to operate the fluid pressure operable motor.

5. For a fluid pressure system in which the operating fluid is placed under pressure by means other than manual means, a regulating valve comprising a valve body having a source of pressure port, a motor port and an exhaust port; a piston reciprocable in the valve body having a passage therethrough; a compression spring bearing at one end against the piston; manually operable means for exerting force through the compression spring to move the piston; a poppet valve element caused by initial movement of the piston to close the passage through the piston and thereby cut off communication between the motor and exhaust ports; a second poppet valve element controlling communication between the source of pressure port and the motor port and caused by subsequent movement of the piston to open communication between the source of pressure port and the motor port; a plunger connected to said second poppet valve element and urged by the pressure of fluid from the pressure source in a direction tending to move said second poppet element to open position; and a second plunger also connected to said second poppet element and urged by the pressure prevailing in the fluid pressure operable motor in a direction tending to move said second poppet element to closed position.

6. For a fluid pressure system in which the operating fluid is placed under pressure by means other than manual means, a regulating valve comprising a valve body having a source of pressure port, a motor port and an exhaust port; a piston reciprocable in the valve body having a passage therethrough; sealing means associated with the outer cylindrical surface of the piston; a compression spring bearing at one end against the piston assembly; manually operable means for exerting force through the compression spring to move the piston; a poppet valve element caused by initial movement of the piston to close the passage through the piston and thereby cut off communication between the motor and exhaust ports; a second poppet valve element controlling communication between the source of pressure port and the motor port and caused by subsequent movement of the piston to open communication between the source of pressure port and the motor port, said second valve element being biased to seated or closed position by the pressure differential between the pressure source and the pressure prevailing in the motor; a plunger-like extension on said second poppet valve element which reduces the effective area acted on by said pressure differential and thereby reduces the force required to move said second valve element from its seat; and a pressure responsive surface also associated with said second poppet element and urged by the pressure prevailing in the fluid pressure operable motor in a direction tending to move said second poppet element to closed position.

7. For a fluid pressure system in which the operating fluid is placed under pressure by means other than manual means, a regulating valve comprising a valve body having a source of pressure port, a motor port and an exhaust port; a piston reciprocable in the valve body having a passage therethrough, and having a head surface subjected to the fluid pressure prevailing at the motor port; sealing means associated with the outer cylindrical surface of the piston; a compression spring bearing at one end against the piston assembly on the side opposite the piston head surface; manually operable means for exerting force through the compression spring to move the piston; a poppet valve element caused by initial movement of the piston to close the passage through the piston and thereby cut off communication between the motor and exhaust ports; a second poppet valve element controlling communication between the source of pressure port and the motor port and caused by subsequent movement of the piston to open communication between the source of pressure port and the motor port, said second valve element being biased to seated or closed position by the pressure differential between the pressure source and the pressure prevailing in the motor; a plunger-like extension on said second poppet valve element which reduces the effective area acted on by said pressure differential and thereby reduces the force required to move said second valve element from its seat; and a pressure responsive surface also associated with said second poppet element and urged by the pressure prevailing in the fluid pressure operable motor in a direction tending to move said second poppet element to closed position.

8. For a fluid pressure system in which the operating fluid is placed under pressure by means other than manual means, a regulating valve comprising a valve body having a source of pressure port, a motor port and an exhaust port; a piston reciprocable in the valve body having a passage therethrough, and having a head surface subjected to the fluid pressure prevailing at the motor port; a compression spring bearing at one end against the piston assembly on the side opposite the piston head surface; manually operable means for exerting force through the compression spring to move the piston; a poppet valve caused by initial movement of the piston to cut off communication between the motor and exhaust ports; a second poppet valve caused by subsequent movement of the piston to open communication between the source of pressure port and the motor port, said second valve element being biased to seated or closed position by the pressure differential between the pressure source and the pressure prevailing in the motor; a plunger-like extension on said second poppet valve element which reduces the effective area acted on by said pressure differential and thereby reduces the force required to move said second valve element from its seat; and a pressure responsive surface also associated with said second poppet element and urged by the pressure prevailing in the fluid pressure operable motor in a direction tending to move said second poppet element to closed position.

9. For a fluid pressure system in which the operating fluid is placed under pressure by means other than manual means, a regulating valve comprising a valve body having a source of pressure port, a motor port and an exhaust port; a piston reciprocable in the valve body having a passage therethrough, and having a head subjected to the fluid pressure prevailing at the motor port; manually operable means for exerting force to move the piston and for receiving the reaction from the fluid pressure acting on the piston head; a poppet valve caused by initial movement of the piston to cut off communication between the motor and exhaust ports; a second poppet valve caused by subsequent movement of the piston to open communication between the source of pressure port and the motor port, said second valve element being biased to seated or closed position by the pressure differential between the pressure source and the pressure prevailing in the motor; a plunger-like extension on said second poppet valve element which reduces the effective area acted on by said pressure differential and thereby reduces the force required to move said second valve element from its seat; and a pressure responsive surface also associated with said second poppet element and urged by the pressure prevailing in the fluid pressure operable motor in a direction tending to move said second poppet element to closed position.

10. In an operator actuated control device having an inlet port connected to a source of fluid pressure, a motor control port connected to a motor operable by fluid under pressure, an exhaust port, and a first valve element controlling communication between the motor control port and the exhaust port, means for controlling communication between the inlet port and the motor control port comprising a second valve element separate from said first valve element, said second valve element being movable independently of said first valve element except that pressure can be exerted through said first valve element tending to move said second valve element away from its seat, said second valve element being biased to seated or closed position by the pressure differential between the pressure source and the pressure prevailing in the motor, a plunger-like extension on said second valve element which reduces the effective area acted on by said pressure differential and thereby reduces the force required to move said second valve element from its seat, and a pressure responsive surface also connected to said second valve element and acted on by the pressure prevailing in the motor, the arrangement being such that increases in said motor pressure acting on said pressure responsive surface increase the pressure urging the second valve element toward its seat.

11. In a regulating valve having an inlet port adapted to be connected to a source of fluid under pressure, and an outlet port adapted to be connected to a motor operable by fluid under pressure, an inlet valve controlling communication between the inlet port and the outlet port comprising a valve element biased to seated or closed position by the pressure differential between the pressure source and the pressure prevailing in the motor, a plunger-like extension on said valve element which reduces the effective area acted on by said pressure differential and thereby reduces the force required to move said valve element from its seat, and a pressure responsive surface also associated with said valve element and urged by the pressure prevailing in the fluid pressure operable motor in a direction tending to move said valve element to closed position.

WILLIAM H. DU BOIS.